Figure 1:
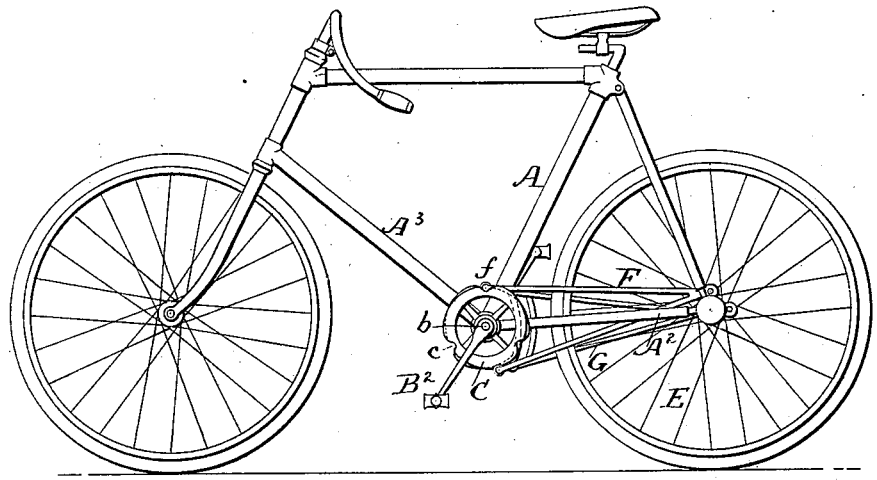

No. 650,345. Patented May 22, 1900.
H. TUTTLE.
MECHANICAL MOVEMENT FOR BICYCLES.
(Application filed Nov. 19, 1897.)
(No Model.)

WITNESSES
A.B. Digger
J.J. Masson

INVENTOR
Hosmer Tuttle
by E.E. Masson, Attorney

THE NORRIS PETERS CO., PHOTO-LITHO., WASHINGTON, D.C.

UNITED STATES PATENT OFFICE.

HOSMER TUTTLE, OF CEDAR RAPIDS, IOWA, ASSIGNOR OF ONE-HALF TO SHELLEY TUTTLE, OF SALT LAKE CITY, UTAH.

MECHANICAL MOVEMENT FOR BICYCLES.

SPECIFICATION forming part of Letters Patent No. 650,345, dated May 22, 1900.

Application filed November 19, 1897. Serial No. 659,065. (No model.)

*To all whom it may concern:*

Be it known that I, HOSMER TUTTLE, a citizen of the United States, residing at Cedar Rapids, in the county of Linn and State of Iowa, have invented certain new and useful Improvements in Mechanical Movements for Bicycles, of which the following is a specification, reference being had therein to the accompanying drawings.

My invention relates to mechanical movements intended mainly for the propulsion of bicycles to take the place of the chain now generally used on safety-bicycles, and thereby reduce the expense and the amount of friction on the machine.

Although the construction of the movement can be used in connection with other machines, it is shown in the drawings applied to a bicycle, the frame of which may be of any suitable form. The construction is an improvement upon that shown in United States Patent No. 564,665, granted to me July 28, 1896.

Figure 2:
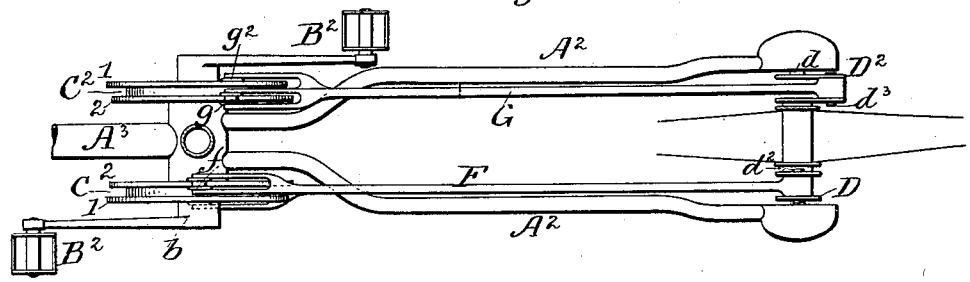
Figure 3:
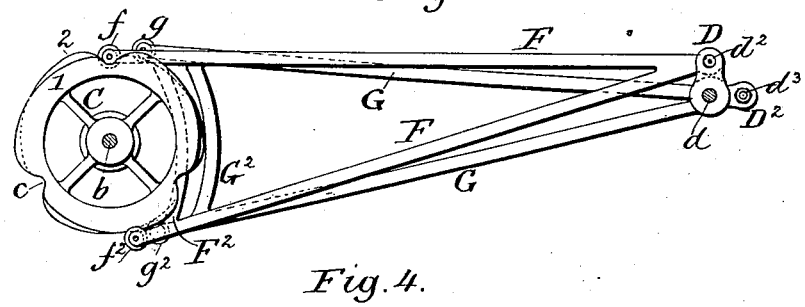
Figure 4:
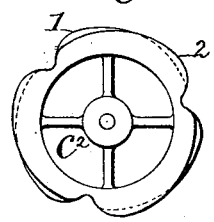

In said drawings, Figure 1 represents a side view of a bicycle provided with a propulsion mechanism constructed in accordance with my invention. Fig. 2 represents, on a larger scale, a top view of the mechanism, showing the two pairs of propelling sprocket-cams. Fig. 3 represents a side view of the same with the pedals and the horizontal portion of the frame removed, but showing only the nearest pair of cams to prevent confusion. Fig. 4 represents a side view of the farthest pair of cams substantially in the position it occupies relatively to the nearest pair.

In Figs. 1, 2, and 3 the propulsion mechanism shown is equal to what is termed "eighty-four gear," but has slightly more leverage. The axle of the rear wheel makes three revolutions to one of the pedal-carrying shaft. If a machine having a different speed is desired, it can be obtained by giving a different diameter to the rear wheel or by using cams having a different number of depressions in their periphery.

In said drawings, A represents the seat-carrying standard of the frame, and $A^2$ the braces between the crank-shaft $b$, carrying the pedals $B^2$ and the spocket-cams C and $C^2$ and the axle $d$ for the rear wheel E, said axle having the cranks D and $D^2$, carrying the crank-pins. Each cam C or $C^2$ has a pair of tracks 1 and 2 on its periphery to operate upon and be followed by flanged rollers mounted on the front ends of the branches of forked connecting-rods that transmit motion to the cranks upon the axle of the rear wheel. The edge of each cam C or $C^2$ constitutes a double track having therein three depressions $c$ at equal distances apart, but formed in conjunction with each other at these points; but between these points the acuteness of the curvature of the outer track 1 on one side of the depression $c$ is greater than on the opposite side of said depression, while in the inner track 2 the acuteness of the curvature is inversed relatively to the track 1. The outer track 1 in Figs. 3 and 4 is shown by full lines, while the inner track 2 is shown partly by dotted lines. The depressions $c$ in the outer track 1 are to operate upon the roller $f$, mounted on the front end of the upper branch of the connecting-rod F to pull it, while the depressions $c$ in the inner track 2 are to operate upon the roller $f^2$, mounted on the front end of the lower branch of the connecting-rod F to push it, these efforts being done alternately, first when one of the depressions $c$ has nearly reached its uppermost position, as in Fig. 3, and has received the roller $f$, and then when one of the depressions $c$ has nearly reached its lowermost position and has received the roller $f^2$. The distance between the inner bearing-surface of the rollers $f$ and $f^2$ on the front ends of the branches of the forked rod F is equal to the diameter of the cam C; but said rollers are not quite in the same vertical plane as the roller $f$ is operated by the top of the track 2, while the roller $f^2$ is operated by the bottom of the track 1. The curvature of said tracks 1 and 2 is such between the depressions $c$ as to keep either the roller $f$ or the roller $f^2$ in engagement with the cam in one of said depressions substantially during one-sixth of the revolution of the cam. Said curvature is slightly more acutely convex in each track 1 and 2 on the rear side of each depression $c$ to force into the substantially diametrically opposite depression either the top or bottom roller of the forked connecting-rod F. The distance between said branches is maintained by a curved brace $f^2$, uniting said branches and adapted to be reciprocated alongside of the cam. Said brace may be made of two members united by a screw, and thus its length made adjustable to compensate for the wear of the cams. The united rear ends of the branches of the connecting-rod F are provided with an eye to receive a crank-pin $d^2$ of the crank-axle. Ball-bearings can be interposed, as usual, between said eye and crank-pin.

The above description relates to the left-hand half of the driving mechanism; but the mechanism on the right-hand side is exactly similar and consists of the forked connecting-rod G, having the curved brace $G^2$. The upper branch of the connecting-rod G has a roller $g$ in its vertically-forked end, and its lower branch has in its forked end a roller $g^2$. The united rear ends of the branches of the rod G are also provided with an eye to receive the crank-pin $d^3$ of the crank $D^2$. The cam $C^2$ is provided with three recesses or pockets $c^2$ equally spaced apart, but so timed relatively to the pockets $c$ of the wheel C as to be about thirty degrees in the rear of each one of them.

To obviate dead-centers in the revolution of the cranks of the rear axle, one of said cranks is placed at ninety degrees or one quarter of a revolution in advance of the other.

The front and rear ends of the braces $A^2$ of the frame can be provided with ball-bearings, as commonly used on bicycles. Said frame is provided with a forward brace $A^3$, as usual.

In the operation of the mechanism the rocking up and down of the rear end of the connecting-rod F or G causes an inverse motion of the front end of said rod; but it is controlled by the tracks 1 and 2 of the cam, with which the rollers remain in constant engagement, and therefore there is no noise.

As there must necessarily be some moments in which the rollers $f$ or $f^2$ of the rod F are not in engagement with either a top or bottom pocket $c$ of the cam C, the duplication of the mechanism is required, and this is accomplished by means of the double-track cam $C^2$ in connection with the forked connecting-rod G, having the rollers $g$ and $g^2$, the roller $g$ following the top of the track 1 and the roller $g^2$ the bottom of the track 2 of said cam.

Having now fully described my invention, I claim—

In a mechanical movement for bicycles, the combination of the axle of one of the carrying-wheels, two crank-pins carried by said axle, two branched connecting-rods, each one mounted at one end upon a crank-pin and having at the opposite end two bearing-surfaces to follow two tracks on the periphery of a cam, and two cams diametrically located between said bearing-surfaces, each cam provided with two tracks of inverted form relatively to each other substantially as described.

In testimony whereof I affix my signature in presence of two witnesses.

HOSMER TUTTLE.

Witnesses:
 THOMAS RYAN,
 G. T. CORRIGAN.